United States Patent
Shi et al.

(10) Patent No.: US 11,158,069 B2
(45) Date of Patent: Oct. 26, 2021

(54) UNSUPERVISED DEFORMABLE REGISTRATION FOR MULTI-MODAL IMAGES

(71) Applicant: Siemens Healthcare GmbH, Erlangen (DE)

(72) Inventors: Bibo Shi, Monmouth Junction, NJ (US); Chen Qin, Princeton Junction, NJ (US); Rui Liao, Princeton Junction, NJ (US); Tommaso Mansi, Plainsboro, NJ (US); Ali Kamen, Skillman, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 256 days.

(21) Appl. No.: 16/428,092

(22) Filed: May 31, 2019

(65) Prior Publication Data
US 2020/0184660 A1    Jun. 11, 2020

Related U.S. Application Data

(60) Provisional application No. 62/777,837, filed on Dec. 11, 2018.

(51) Int. Cl.
*G06T 7/30*    (2017.01)
(52) U.S. Cl.
CPC ...... *G06T 7/30* (2017.01); *G06T 2207/10081* (2013.01); *G06T 2207/10088* (2013.01); *G06T 2207/10104* (2013.01); *G06T 2207/10132* (2013.01); *G06T 2207/20081* (2013.01); *G06T 2207/20084* (2013.01); *G06T 2207/30068* (2013.01)

(58) Field of Classification Search
CPC ............ G06T 7/30; G06T 2207/20081; G06T 2207/10088; G06T 2207/20084; G06T 2207/10104; G06T 2207/10132; G06T 2207/30068; G06T 2207/10081; G06T 2207/10136; G06T 2207/10072
See application file for complete search history.

(56) References Cited

U.S. PATENT DOCUMENTS

| | | | | |
|---|---|---|---|---|
| 7,822,291 | B2 * | 10/2010 | Guetter | G06T 7/35 382/294 |
| 11,049,243 | B2 * | 6/2021 | Odry | G06K 9/6244 |
| 2017/0337682 | A1 * | 11/2017 | Liao | G06T 7/30 |
| 2018/0225823 | A1 * | 8/2018 | Zhou | G06N 3/0454 |
| 2018/0330511 | A1 * | 11/2018 | Ha | G06K 9/6247 |

(Continued)

OTHER PUBLICATIONS

Yan, P., et al., "Adversarial Image Registration with Application for MR and TRUS Image Fusion," Proceedings of International Workshop on Machine Learning in Medical Imaging (MLMI), pp. 197-204, Granada, Spain, Sep. 16, 2018.*

(Continued)

*Primary Examiner* — Xuemei G Chen

(57) ABSTRACT

In order to reduce computation time and provide more accurate solutions for bi-directional, multi-modal image registration, a learning-based unsupervised multi-modal deformable image registration method that does not require any aligned image pairs or anatomical landmarks is provided. A bi-directional registration function is learned based on disentangled shape representation by optimizing a similarity criterion defined on both latent space and image space.

20 Claims, 7 Drawing Sheets

(56) References Cited

U.S. PATENT DOCUMENTS

| | | | | |
|---|---|---|---|---|
| 2020/0034654 | A1* | 1/2020 | Mansi | G06F 17/18 |
| 2020/0085382 | A1* | 3/2020 | Taerum | G06T 7/30 |
| 2020/0129784 | A1* | 4/2020 | Beriault | A61N 5/1049 |
| 2020/0146635 | A1* | 5/2020 | Wang | G06K 9/6206 |
| 2020/0380675 | A1* | 12/2020 | Golden | G06T 7/194 |

OTHER PUBLICATIONS

Mao, X., et al., "Semantic invariant cross-domain image generation with generative adversarial networks," Neurocomputing, vol. 293, Jun. 2018, pp. 55-63.*

Balakrishnan, Guha, et al. "An unsupervised learning model for deformable medical image registration." Proceedings of the IEEE conference on computer vision and pattern recognition. 2018.

Balakrishnan, Guha, et al. "VoxelMorph: a learning framework for deformable medical image registration." IEEE transactions on medical imaging (2019).

Cao, Xiaohuan, et al. "Dual-core steered non-rigid registration for multi-modal images via bi-directional image synthesis." Medical image analysis 41 (2017): 18.

Fan, Jingfan, et al. "Adversarial similarity network for evaluating image alignment in deep learning based registration." International Conference on Medical Image Computing and Computer-Assisted Intervention. Springer, Cham, 2018.

Haskins, Grant, et al. "Deep Learning in Medical Image Registration: A Survey." arXiv preprint arXiv:1903.02026 (2019).

Heinrich, Mattias P., et al. "MIND: Modality independent neighbourhood descriptor for multi-modal deformable registration." Medical image analysis 16.7 (2012): 1423-1435.

Hu, et al.; "Weakly-Supervised Convolutional Neural Networks for Multimodal Image Registration," Medical Image Analysis (2018), doi: 10.1016/j.media.2018.07.002.

Ilg, Eddy, et al. "Flownet 2.0: Evolution of optical flow estimation with deep networks." Proceedings of the IEEE conference on computer vision and pattern recognition. 2017.

Klein, Stefan, et al. "Automatic segmentation of the prostate in 3D Mr images by atlas matching using localized mutual information." Medical physics 35.4 (2008): 1407-1417.

Krebs, Julian, et al. "Learning a probabilistic model for diffeomorphic registration." IEEE transactions on medical imaging (2019).

Krebs, Julian, et al. "Unsupervised probabilistic deformation modeling for robust diffeomorphic registration." Deep Learning in Medical Image Analysis and Multimodal Learning for Clinical Decision Support. Springer, Cham, 2018. 101-109.

M. Jaderberg, K. Simonyan, A. Zisserman, et al. Spatial transformer networks. In Advances in neural information processing systems,pp. 2017-2025, 2015.

Mahapatra, Dwarikanath, et al. "Deformable medical image registration using generative adversarial networks." 2018 IEEE 15th International Symposium on Biomedical Imaging (ISBI 2018). IEEE, 2018.

Mattes, David, et al. "PET-CT image registration in the chest using free-form deformations." IEEE transactions on medical imaging 22.1 (2003): 120-128.

Pluim, Josien PW, JB Antoine Maintz, and Max A. Viergever. "Mutual-information-based registration of medical images: a survey." IEEE transactions on medical imaging 22.8 (2003): 986-1004.

Roche, Alexis, et al. "Rigid registration of 3-D ultrasound with MR images: a new approach combining intensity and gradient information." IEEE transactions on medical imaging 20.10 (2001): 1038-1049.

Sotiras, Aristeidis, Christos Davatzikos, and Nikos Paragios. "Deformable medical image registration: A survey." IEEE transactions on medical imaging 32.7 (2013): 1153.

Studholme, Colin, Derek LG Hill, and David J. Hawkes. "An overlap invariant entropy measure of 3D medical image alignment." Pattern recognition 32.1 (1999): 71-86.

Chen, et al. "Unsupervised Deformable Registration for Multi-Modal Images via Disentangled Representations." arXiv preprint arXiv:1903.09331 (Mar. 2019).

Dalca, et al.; Unsupervised learning for fast probabilistic diffeomorphic registration. arXiv preprint arXiv:1805.04605, 2018. 2, 8.

Viergever, Max A., et al. "A survey of medical image registration—under review." (2016): 140-144.

* cited by examiner

UNSUPERVISED DEFORMABLE REGISTRATION FOR MULTI-MODAL IMAGES

RELATED APPLICATIONS

The present patent document claims the benefit of the filing date under 35 U.S.C. § 119(e) of Provisional U.S. Patent Application Ser. No. 62/777,837, filed Dec. 11, 2018, which is hereby incorporated by reference.

FIELD

The present embodiments are related to image registration.

BACKGROUND

Different medical image modalities, such as magnetic resonance imaging (MRI), computed tomography (CT), and positron emission tomography (PET), show unique tissue features at different spatial resolutions. In clinical practice, multiple image modalities may be fused for diagnostic or interventional purpose, providing the combination of complementary information. Images from different modalities, however, are often acquired with different scanners and at different time points with some intra-patient anatomical changes. Multi-modal images are to be registered for an accurate analysis and interpretation.

Multi-modal image registration is a challenging problem due to the unknown and complex relationship between intensity distributions of the images to be aligned. Also, features may be present in one modality but missing in another. Previous multi-modal image approaches either rely on information theoretic measures such as mutual information or on landmarks being identified in both images. Information theoretic measures, however, often ignore spatial information, and anatomical landmarks may not always be localized in both images. Further, landmark detection may be time-consuming or may not be possible in image-guided intervention.

SUMMARY

In order to reduce computation time and provide more accurate solutions for bi-directional, multi-modal image registration, a learning-based unsupervised multi-modal deformable image registration method that does not require any aligned image pairs or anatomical landmarks is provided. A bi-directional registration function is learned based on disentangled shape representation by optimizing a similarity criterion defined on both latent space and image space.

In an embodiment, a method for unsupervised multi-modal image registration includes acquiring a first image generated by a first medical imaging modality. A second image generated by a second medical imaging modality is acquired. The second imaging modality is different than the first medical imaging modality. A prediction of deformation fields is generated between the first image and the second image. The deformation fields are generated by a machine-learned generator having been trained in domain-invariant space with machine-learned discriminators having being trained in image space.

In an embodiment, the first medical imaging modality is one of a magnetic resonance imaging (MRI) device, a computed tomography (CT) device, a positron emission tomography (PET) device, an ultrasound device, a dynaCT device, an angiogram device, and a mammography device, and the second medical imaging modality is another of the MRI device, the CT device, the PET device, the ultrasound device, the dynaCT device, the angiogram device, and the mammography device.

In an embodiment, the first image and the second image are three-dimensional (3D) images, respectively.

In an embodiment, generating includes generating with the machine-learned generator having been trained with learned shape features in the domain-invariant space decomposed from multi-modal image pairs representing a region of interest. Images of each of the multi-modal image pairs have been generated by the first medical imaging modality and the second medical imaging modality, respectively.

In an embodiment, generating includes generating with the machine-learned generator having been trained with the shape images decomposed by machine-learned encoders of an image translation network.

In an embodiment, images of the multi-modal image pairs are not aligned.

In an embodiment, generating includes generating by the machine-learned generator having been trained with latent similarity loss, and the discriminators having been trained with adversarial loss.

In an embodiment, registering includes registering the first image with the second image using a first of the deformation fields when the first image is a moving image and the second image is a fixed image, and registering the second image with the first image using a second of the deformation fields when the second image is the moving image and the first image is the fixed image.

In an embodiment, the discriminators are desriminators of a generative adversarial network (GAN).

In an embodiment, generating includes generating with the machine-learned discriminators having been trained based on translated images from a machine-learned image translation network.

In an embodiment, a system for unsupervised multi-modal image registration includes a memory configured to store a first image and a second image. The first image is generated by a first modality, and the second image is generated by a second modality. The system also includes an image processor in communication with the memory. The image processor is configured to generate a prediction of deformation fields between the first image and the second image in response to input of the first image and the second image to a machine-learned generator having been trained in domain-invariant space and machine-learned discriminators having been trained in image space. The image processor is further configured to register the first image and the second image using one of the predicted deformation fields.

In an embodiment, the system further includes a display in communication with the image processor. The display is configured to display the registered first image and second image, at least one of the deformation fields, or the registered first image and second image and the at least one deformation field.

In an embodiment, the system further includes the first modality in communication with the image processor, and the second modality in communication with the image processor.

In an embodiment, the first modality is one of an MRI device, a CT device, a PET device, an ultrasound device, a dynaCT device, an angiogram device, and a mammography device, and the second modality is another of the MRI device, the CT device, the PET device, the ultrasound device, the dynaCT device, the angiogram device, and the mammography device.

In an embodiment, the first image and the second image are two-dimensional (2D) images, respectively.

In an embodiment, a method for machine training unsupervised multi-modal image registration in a medical imaging system includes defining a multi-task network with an objective function including a loss term representing latent space similarity and a loss term representing image space similarity. The multi-task network is machine trained to estimate a prediction of a deformation field for registration between a first image generated by a first modality and a second image generated by a second modality. The machine training is based on latent shape features in the latent space decomposed form multi-modal image pairs representing a region of interest. Images of each of the multi-modal image pairs have been generated by the first modality and the second modality, respectively.

In an embodiment, images of the multi-modal image pairs are not aligned.

In an embodiment, the method further includes storing, by a memory, the machine-trained multi-task network.

In an embodiment, the machine training is also based on translated images generated from the multi-modal image pairs being input into an image translation network.

In an embodiment, the method further includes registering the first image and the second image using the machine trained multi-task network.

DETAILED DESCRIPTION OF THE DRAWINGS

An unsupervised registration method for aligning intra-subject multi-modal images without ground truth deformation fields, aligned multi-modal image pairs, or any anatomical landmarks during training is provided. A parameterized registration function is learned via reducing a multi-modal registration problem to a mono-modal registration problem in latent embedding space.

For example, in one or more of the present embodiments, images are decomposed into a domain-invariant latent shape representation and a domain-specific appearance code based on the multi-modal unsupervised image-to-image translation framework (MUNIT). With the assumption that the intrinsic shape deformation between multi-modal image pairs is preserved in the domain-invariant shape space, an unsupervised diffeomorphic registration network is learned directly based on the disentangled shape representations. A similarity criterion may thus be defined in the latent space, minimizing a latent shape distance between a warped moving image and a target image.

A complimentary learning-based similarity metric is also provided. The complimentary learning-based similarity metric is defined via an adversarial loss to distinguish whether a pair of images is sufficiently aligned or not in the image domain. Since transformation is learned from a domain-invariant space, the method is directly applicable to bi-directional multi-modal registration without extra efforts (e.g., without landmark identification and/or supervised pairing).

Images of different modalities are embedded into a domain-invariant space via image disentangling, where any meaningful geometrical deformation may be directly derived in the latent space. The method includes three parts: an image disentangling network via unpaired image-to-image translation (e.g., an image translation network); a deformable registration network in the disentangled latent space; and an adversarial network.

Figure 1:
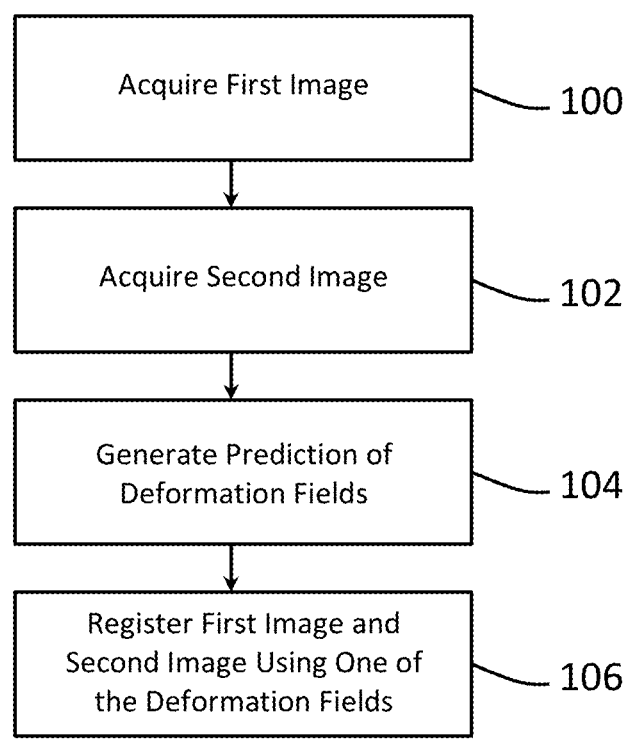
FIG. 1 shows a flowchart of one embodiment of a method for unsupervised multi-modal image registration.

FIG. 1 shows a flowchart of one embodiment of a method for unsupervised multi-modal image registration. The method may be performed using any number of imaging systems. The method is implemented in the order shown, but other orders may be used. For example, the method may not include use of the adversarial network.

The method is performed by medical imaging devices, a workstation, a server, a computer, or any combination thereof. The medical imaging devices or a memory of the medical imaging devices, the workstation, the server, and/or the computer are used to acquire data (e.g., image data) for a patient. An image processor, such as an image processor of the medical imaging devices, the workstation, the server, and/or the computer disentangle images and/or predict deformation fields. The image processor displays using a display screen or printer. A physician may use the output information to make a treatment decision for the patient.

In act 100, a first image is acquired. The first image is generated by a first medical image modality. The first medical image modality may be any number of medical imaging devices including, for example, a magnetic resonance imaging (MRI) device, a computed tomography (CT) device, a positron emission tomography (PET) device, an ultrasound device, a dynaCT device, an angiogram device, a mammography device, or another type of medical imaging device.

The first image represents a region of interest within a patient. For example, the first image represents at least a portion of the liver of the patient. The first image may represent other regions of interest. In one embodiment, the first image is a three-dimensional (3D) image. In another embodiment, the first image is a two-dimensional (2D) image. For example, the first image may be a 2D image generated from a 3D volume. The first image may be of a particular size and/or resolution. For example, the first image is a 2D slice from a 3D volume with a size of 128*128*128 and a resolution of 2.5 mm. Other sizes and resolutions may be provided. The first image and/or the 3D volume from which the first image is generated may be cropped and/or downsampled.

In act 102, a second image is acquired. The second image is generated by a second medical image modality. The second medical imaging modality is different than the first medical imaging modality. The second medical image modality may be any number of medical imaging devices including, for example, a magnetic resonance imaging (MRI) device, a computed tomography (CT) device, a positron emission tomography (PET) device, an ultrasound device, a dynaCT device, an angiogram device, a mammography device, or another type of medical imaging device.

The second image represents the same region of interest within the same patient as the first image. For example, the second image represents at least a portion of the liver of the patient. The second image may represent other regions of interest. In one embodiment, the second image is a 3D image. In another embodiment, the second image is a two-dimensional (2D) image. The second image may have the same or different dimensionality, size, and/or resolution as the first image. The second image may be of a particular size and/or resolution. For example, the second image is a 2D slice from a 3D volume with a size of 128*128*128 and a resolution of 2.5 mm. Other sizes and resolutions may be provided. The second image and/or the 3D volume from which the second image is generated may be cropped and/or downsampled.

In act 104, a prediction of deformation fields between the first image and the second image is generated. The deformation fields are generated by optimizing a bi-directional registration function. The bi-directional optimized registration function is implemented by a machine learned generator trained in domain-invariant space. In one embodiment, the bi-directional optimized registration function also represents machine-learned discriminators (e.g., GAN discriminators, PatchGAN discriminators) having been trained in image space.

In one embodiment, the generating of act 104 includes generating with a machine-learned generator (e.g., of a deformable registration network) that has been trained with learned shape features in the domain-invariant space. The learned shape features are decomposed from multi-modal image pairs representing a region of interest (e.g., the same region of interest as represented by the first image from act 100 and the second image from act 102). For training, images of each of the multi-modal image pairs have been generated by the first medical imaging modality and the second medical imaging modality, respectively. An image processor may acquire the multi-modal image pairs from a memory (e.g., a database) in communication with the image processor. The multi-modal image pairs may not be aligned, and images of the multi-modal image pairs may represent different patients and/or may be recorded at different times.

Figure 2:
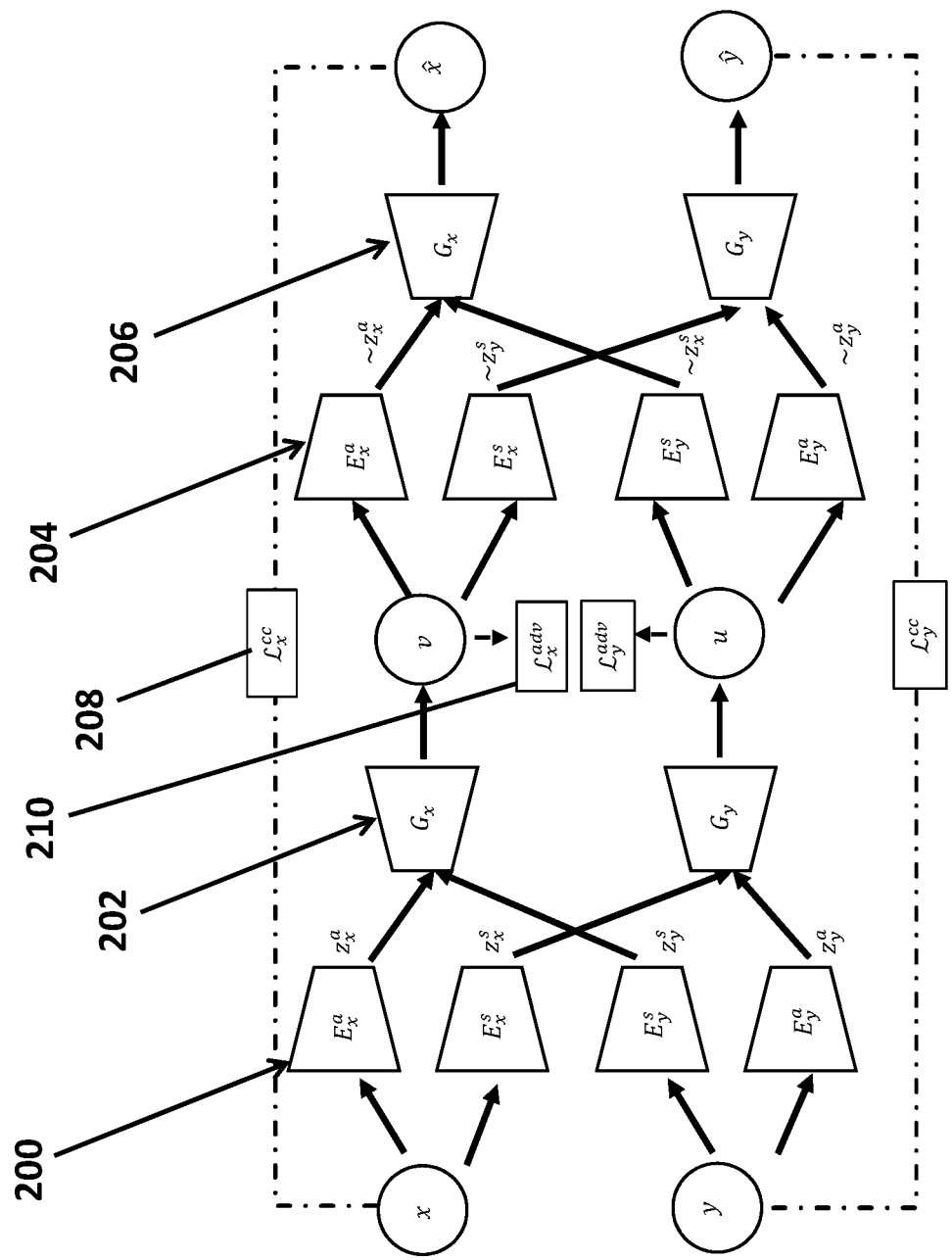
FIG. 2 shows a flowchart of a method and corresponding network architecture of one embodiment for training an image translation network.

In one example, the generating of act 104 may include generating with a machine-learned generator having been trained with learned shape features decomposed by encoders (e.g., machine-learned encoders) of a machine-learned image translation network. FIG. 2 shows a flowchart of a method and corresponding network architecture of one embodiment for training an image translation network. The method may be performed using any number of imaging systems. The method is implemented in the order shown, but other orders may be used.

Images (e.g., the multi-modal image pairs) are embedded into a domain-invariant content space capturing shared information (e.g., underlying spatial structure) and a domain-specific attribute space. Assuming x, an element of X, and y, an element of Y, denote unpaired images from two different modalities, and taking domain X as an example, image x is disentangled into a shape code (e.g., a shape content code) $z_x^s$ in a domain-invariant space S and an appearance code $z_x^\alpha$ in a domain specific space $A_X$, where $\{z_x^s, z_x^\alpha\} = \{E_X^s(x), E_X^\alpha(x)\}$, in act 200. $\{E_X^s, E_Y^s\}$ and $\{E_X^\alpha, E_Y^\alpha\}$ are shape encoders and appearance encoders, respectively.

In act 202, the generator $G_X$ generates images conditioned on both shape and appearance vectors from respective shapes and appearances from both modalities X and Y. Image-to-image translation is performed by swapping latent codes in two domains. For example, $v = G_X(z_x^\alpha, z_y^s)$, so that image y is translated to target domain X. Acts 200 and 202 also apply for image y.

To train the framework for image translation and achieve representation disentanglement, a bidirectional reconstruction loss is used. The bidirectional reconstruction loss includes image self-reconstruction loss ($\mathcal{L}_x^{rec}$) and latent reconstruction loss ($\mathcal{L}_{x^s}^{lat}$, $\mathcal{L}_{y^\alpha}^{lat}$):

$$\mathcal{L}_x^{rec} = \mathbb{E}_x[\|G_X(E_X^s(x), E_X^\alpha(x)) - x\|_1],$$

$$\mathcal{L}_{x^s}^{lat} = \mathbb{E}_{x,y}[\|E_y^s(G_y(z_x^s, z_y^\alpha)) - z_x^s\|_1],$$

$$\mathcal{L}_{y^\alpha}^{lat} = \mathbb{E}_{x,y}[\|E_y^\alpha(G_y(z_x^s, z_y^\alpha)) - z_y^\alpha\|_1].$$

Figure 3:
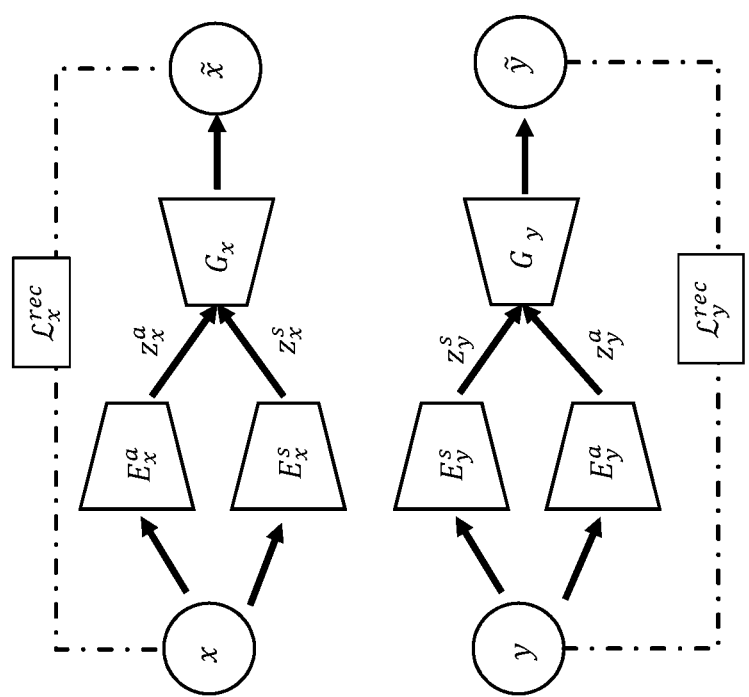
FIG. 3 illustrates examples of self-reconstruction loss for a multi-modal pair of images.

For the image x, for example, the self-reconstruction loss compares an image generated by the generator $G_X$ conditioned on the shape code $z_x^s$ and the appearance code $z_x^\alpha$ disentangled from image x in act 200 with the original image x. FIG. 3 illustrates an example of self-reconstruction loss for images x and y.

To determine the latent reconstruction loss, in act 204, each of the translated images (e.g., translated images v and u) is disentangled into a shape code (e.g., the shape code $z_x^s$) in the domain-invariant space S and an appearance code (e.g., the appearance code $z_x^\alpha$) in the respective domain specific space (e.g., the domain specific space $A_X$). For the latent reconstructions loss for image x, $\mathcal{L}_{x^s}^{lat}$, for example, the shape code disentangled from translated image u in act 204 is compared to the shape code $z_x^s$ in the domain-invariant space S from act 200. For the latent reconstructions loss for image y, $\mathcal{L}_{y^\alpha}^{lat}$, for example, the appearance code disentangled from translated image u in act 204 is compared to the appearance code $z_y^\alpha$ in the domain specific space $A_Y$ for image y from act 200.

In act 206, image-to-image translation is again performed by swapping latent codes in the two domains. In order to better preserve the shape information, an extra loss term (at 208) comparing resultant images from the image-to-image translation of act 206 (x̂, ŷ) with the original images (x, y) may be included to provide cross-cycle consistency:

$$\mathcal{L}_x^{sa} = \mathbb{E}_{x,y}[\|G_X(E_y^s(u), E_X^\alpha(v)) - x\|_1 + \|G_y(E_X^s(v), E_y^\alpha(u)) - y\|_1].$$

Adversarial losses $\mathcal{L}_X^{adv}$ and $\mathcal{L}_Y^{adv}$ (at 210) are also employed to match the distribution of translated images to the image distribution in the target domain.

The image translation network is trained with a plurality of multi-modal image pairs acquired by, for example, an image processor and embedded into the image translation network of FIG. 2. The image translation network may trained in any number of ways including, for example, by a weighted sum of image self-reconstruction loss, latent representation reconstruction loss, adversarial loss, and the cross-cycle consistency loss. In other embodiments, the image translation network may be trained based on more, fewer, and/or different representations of loss. For example, the image translation network may be trained by a weighted sum of latent representation reconstruction loss, adversarial loss, and the cross-cycle consistency loss, without the image self-reconstruction loss. Other combinations of loss representations may be provided.

With image translation, and thus the encoders $\{E_X^s, E_Y^{ns}\}$ and $\{E_X^\alpha, E_Y^\alpha\}$ of the image translation network of FIG. 2, being learned, a multi-modal registration problem is reduced to a mono-modal registration by embedding images into the common latent shape space, and deformation is learned in the common latent shape space. The machine-learned encoders of the machine-learned image translation network may be saved, for example, by a memory in communication with the image processor and used to train the deformable registration network (e.g., the generator of the deformable registration network) and the adversarial network (e.g., the discriminators of the adversarial network).

Figure 4:
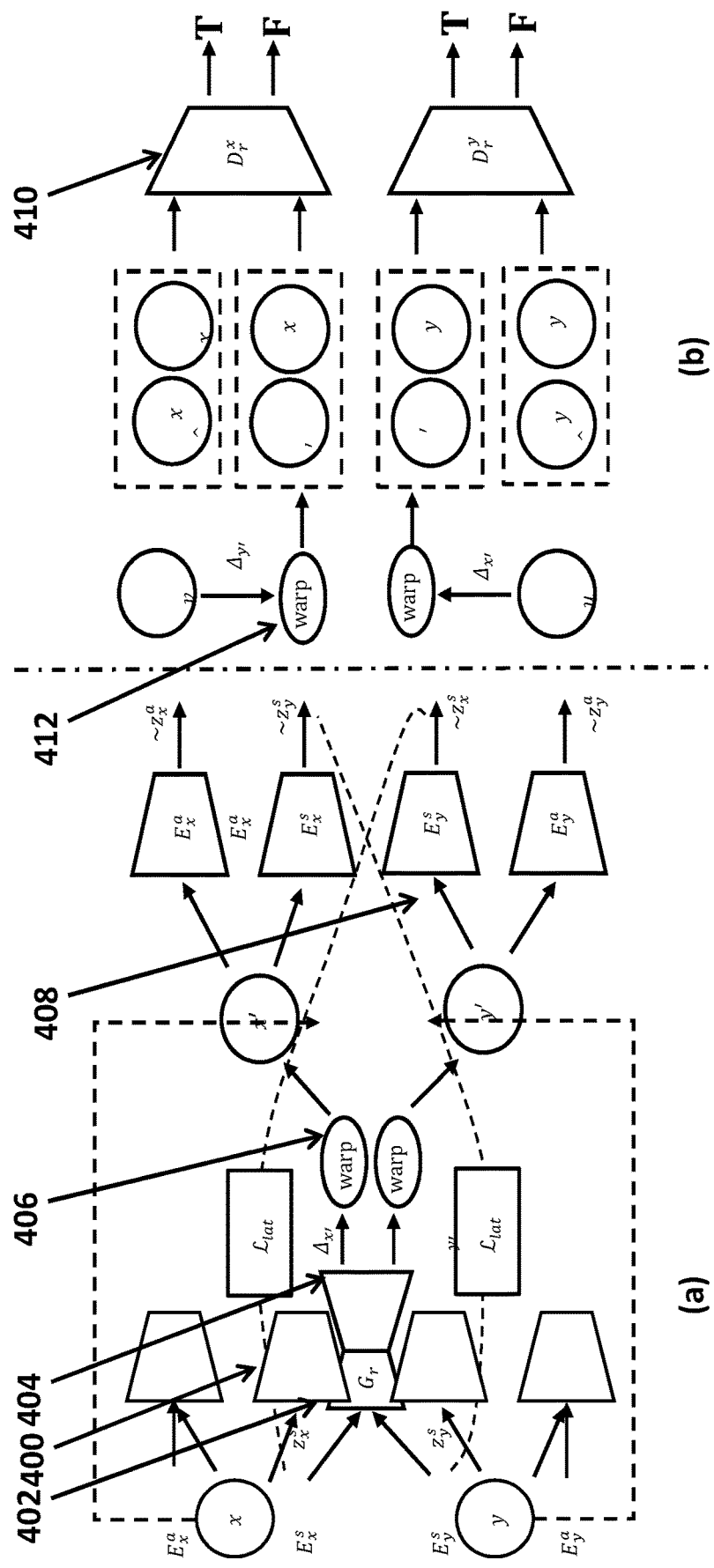
FIG. 4 shows a flowchart of a method and corresponding network architecture of one embodiment for training a deformable registration network.

FIG. 4 shows a flowchart of a method and corresponding network architecture of one embodiment for training a deformable registration network. The method may be performed using any number of imaging systems. The method is implemented in the order shown, but other orders may be used.

In act 400, images generated by different modalities (e.g., the same multi-modal image pairs embedded into the image translation network of FIG. 2) are disentangled (e.g., decoupled) into a shared shape space S and different appearance spaces $A_x$ and $A_y$, respectively. The images are decoupled using, for example, the machine-learned encoders of the image translation network of FIG. 2 saved, for example, by the memory.

The decoupled latent shape representations $z_x^s$, $z_y^s$ contain high-level structure information of images that is capable of restoring an original image by combining with corresponding appearance code. Relying on this, the deformable registration network is learned by aligning images via the decoupled latent shape representations $z_x^s$, $z_y^s$.

When registering (e.g., warping) a moving image y∈Y to a fixed image x∈X, for example, the structure of the warped moving image y'∈Y is to be similar to the structure of the fixed image x∈X, while keeping the appearance unchanged. A similarity criterion for training the deformable registration network may thus be defined in the disentangled latent shape space, where deformations are derived regardless of any modal information.

A deformable registration network (e.g., including the generator, $G_r$) that receives the decoupled latent shape representations $z_x^s$, $z_y^s$ as inputs at act 402 and predicts a dense deformation field Δ between the moving image and the fixed image at act 404. Deformation fields $Δ_x$, $Δ_y$ may be predicted for both the moving image y and the fixed image x.

Figure 5:
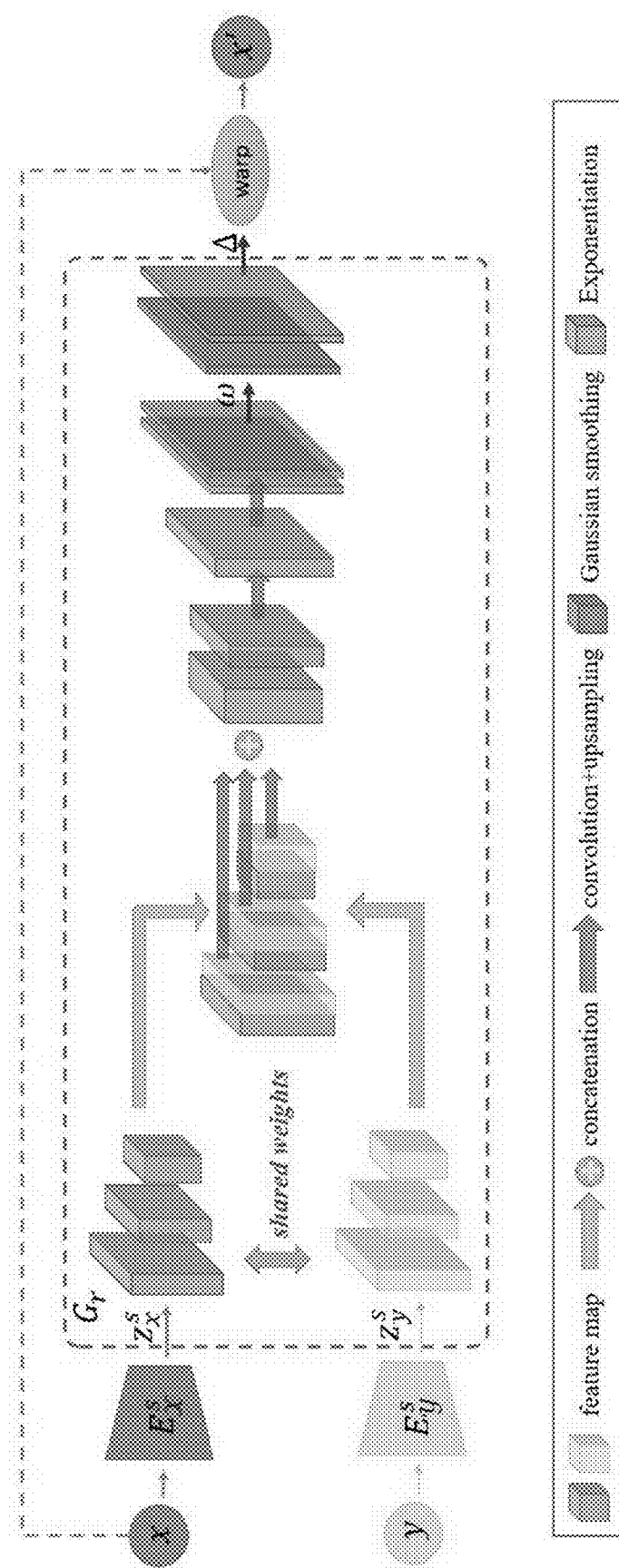
FIG. 5 shows one embodiment of the generator of the deformable registration network.

FIG. 5 shows one embodiment of the generator $G_r$ of the deformable registration network. The generator shown in FIG. 5 represents a spatial transformer network (STN) that generates warping functions corresponding to, for example, the images input to the generator. The STN deals with multivariable features and captures features at different scales. The STN may share weights for different dimensionality between the input images. The generator of the STN may process the input images in any number of ways to generate the warping functions, including, for example, concatenation, convolution and upsampling, Gaussian smoothing, and exponentiation. The input images may be original images or decoupled latent shape representations. Other generators may be used.

In act 406, the moving image y and the fixed image x are warped. In other words, corresponding deformation fields $Δ_x$, $Δ_y$, are applied to the fixed image x and the moving image y, respectively. Warped images x' and y' result from the deformations applied in act 406.

To train the deformable registration network, the warped moving image y', for example, is then encoded back to the latent shape space in act 408. Accordingly, similarity between shape representations $E_y^s$ (y') and $z_x^s$ may be enforced. The same applies for $E_x^s$ (x') and $z_y^s$.

Since both images are mapped to a common feature space (e.g., a modality-free space), the deformable registration network learned in this space is directly applicable to be bi-directional. This is in contrast to learning a registration network in image space where registration for bi-directions may need to be trained separately, as bi-directional registration is not symmetric. Therefore, by incorporating the intrinsic advantage of bi-directional registration, the network may be trained by minimizing the following similarity metric that is defined on latent space:

$$\mathcal{L}_{lat} = \mathbb{E}_{x,y}[\|E_y^s(y')-z_x^s\|_1 + \|E_x^s(x')-z_y^s\|_1] + \lambda_\Delta[\mathcal{H}(\nabla_{i,j}\Delta_y) + \mathcal{H}(\nabla_{i,j}\Delta_x)],$$

wherein the gradients of the deformation field $Δ_x$, $Δ_y$, are penalized using an approximation of Huber loss $\mathcal{H}(\nabla_{i,j}\Delta)= \sqrt{\epsilon+\Sigma_{m=i,j}(\nabla_i\Delta m^2+\nabla_j\Delta m^2)}$ along both i and j directions to provide smoothness. $\lambda_\Delta$ is a regularization parameter to trade-off between different terms, and $\epsilon$=0.01. In other embodiments, other forms of regularization loss may be used instead of Huber loss to provide that a regular deformation field is learned.

As discussed above, the bi-directional optimized registration function (e.g., the similarity metric) may also be defined on image space (e.g., representing machine-learned discriminators). While disentangled latent shape representations may effectively capture high-level structural information, training with latent similarity criterion only may ignore some detailed structure deformations. To compensate, the latent similarity criterion may be combined with an additional learning-based similarity metric in image space.

The learning-based similarity metric in image space may be defined on the modality-free shape space via image translation. However, during image translation, some mismatch of distributions may exist between synthesized images (e.g., translated images) and target images, especially when appearance distributions of real images are complex. Thus, mono-modal registration methods based on intensity similarities may not be sufficient. Therefore, instead of using a specific intensity-based similarity measure, a similarity metric function formulated by a discriminator 410 (e.g., a GAN discriminator or a PatchGAN discriminator) that is trained to distinguish if a pair of image patches are well-aligned or not is used. To mitigate influence of distribution mismatch, cycle-consistency of the translation network (see FIG. 2) is utilized when designing real pairs of images (e.g., well-aligned images) and fake pairs of images (e.g., registered images): $\{G_X(E_y^s(u), E_X^\alpha(v)), x\}$ and $\{v', x\}$, where v' indicates the corresponding warped images of v (see element 412).

For example, the real pair of images for the discriminator $D_r^X$ may be the resultant image $\hat{x}$ from the learned image translation network (e.g., resulting from act 206 of the method of FIG. 2) and the original image x embedded into the image translation network, and the fake pair of images for the discriminator $D_r^X$ may be a warped image v' of the translated image v of the translated image network (e.g., resulting from act 202 of the method of FIG. 2) and the original image x embedded into the image translation network; the real pair of images for the discriminator $D_r^y$ may be a warped image u' of the translated image u of the translated image network (e.g., resulting from act 202 of the method of FIG. 2) and the original image y embedded into the image translation network, and the fake pair of images for the discriminator $D_r^y$ may be the resultant image ŷ from the learned image translation network (e.g., resulting from act 206 of the method of FIG. 2) and the original image y embedded into the image translation network. Other combinations and/or number of combinations may be used.

This is to enforce the discriminator to learn structure alignment instead of distribution differences. Architecture of the discriminators follows the design of the feature encoder in the deformable registration network. The adversarial training problem may be formulated using, for example, the improved Wasserstein GAN (WGAN-GP). Other models such as, for example, other GAN-like or GAN models, may be used. The image registration network $G_r$ (e.g., the generator) and two discriminators $D_r^x$ and $D_r^y$ may be trained via alternatively optimizing the respective composite loss functions:

$$\mathcal{L}_{D_r^X} = \mathop{\mathbb{E}}_{\tilde{q} \sim \mathbb{P}_f} [D_r^X(\tilde{q})] - \mathop{\mathbb{E}}_{q \sim \mathbb{P}_r} [D_r^X(q)] + \lambda_{grad} \cdot \mathcal{L}_{grad}^X$$

$$\mathcal{L}_{D_r^y} = \mathop{\mathbb{E}}_{\tilde{p} \sim \mathbb{P}_f} [D_r^y(\tilde{p})] - \mathop{\mathbb{E}}_{p \sim \mathbb{P}_r} [D_r^y(q)] + \lambda_{grad} \cdot \mathcal{L}_{grad}^y$$

$$\mathcal{L}_{G_r} = \mathop{\mathbb{E}}_{\tilde{q} \sim \mathbb{P}_f} [D_r^X(\tilde{q})] - \mathop{\mathbb{E}}_{\tilde{p} \sim \mathbb{P}_r} [D_r^y(\tilde{p})] + \alpha \mathcal{L}_{lat},$$

where $D_r^x$ and $D_r^y$ are two discriminators for the bi-directional registration to distinguish real pairs and fake pairs in X and Y domain. {q, q̃} and {p, p̃} are (real, fake) pairs sampled from X and Y respectively. $\mathcal{L}_{grad}^x$ rad is the gradient penalty for the discriminator $D_r^x$, which may be expressed as the form of $$\mathcal{L}_{grad}^X = \mathop{\mathbb{E}}_{\hat{q} \sim P_{\hat{q}}} [(\|\nabla_{\hat{q}} D_r^X(\hat{q})\|_2 - 1)^2]$$

with q̂ sampled uniformly between q and q̃, and the same with $\mathcal{L}_{grad}^y$. α is a parameter to balance between the learning-based image space similarity metric and the latent space similarity metric.

The result of the optimization (e.g., the generator $G_r$ shown in FIG. 4) is a learned deformable registration network that predicts dense deformation fields between images based on latent shape representations decomposed from the images, respectively, input into the learned deformable registration network. The learned deformable registration network predicts a respective dense deformation field for each of the images. The learned deformable registration network and/or the learned discriminators may be saved by the memory.

Figure 6:
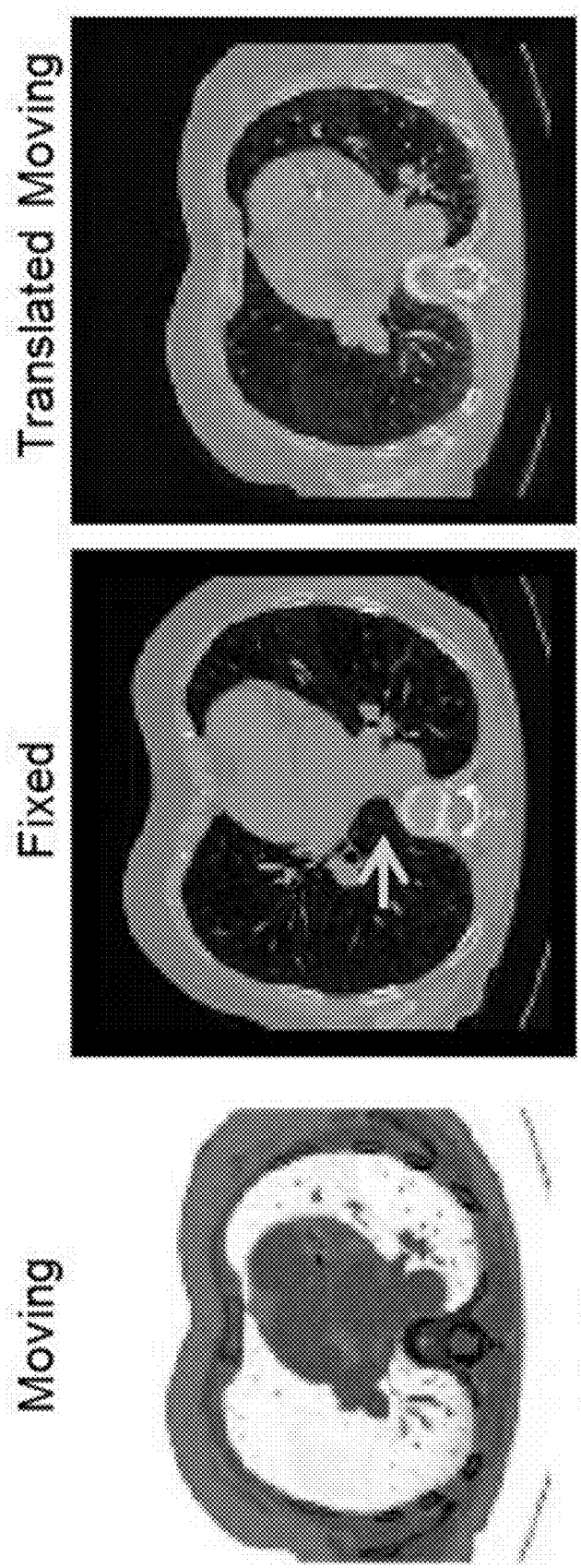
FIG. 6 shows an example of a moving image, a fixed image, and a translated moving image based on a warping of one or more of the present embodiments.

Referring to FIG. 1, in act 106, the first image and the second image are registered using one of the predicted deformation fields. One of the first image and the second image is identified as a moving image, and the other of the first image and the second image is identified as a fixed image. The predicted deformation field corresponding to the moving image (e.g., the first image) is identified, and the moving image is warped (e.g., deformed) based on identified predicted deformation field. The warped moving image is thus registered to the fixed image. FIG. 6 shows an example of a moving image (e.g., x), a fixed image (e.g., y), and a translated moving image (e.g., x') based on such a warping.

Only one of the predicted dense deformation fields may be used for a particular registration, as only one of the images (e.g., identified as the moving image) is to be deformed. For example, an MRI image of a region of interest within a patient may be generated by an MRI device prior to an ultrasound procedure, and ultrasound images of the region of interest within the patient may be generated an ultrasound device during the ultrasound procedure. The MRI image may be identified as the moving image, and the ultrasound images may be identified as fixed images. The image translation network, the deformable registration network, and the discriminators may be trained based on pairs of images of the same region of interest generated by the MRI device and the ultrasound device, respectively. The machine-learned deformable registration network may take a latent space representation of the MRI image as an input. The latent space representation of the MRI may be decomposed by a machine-learned encoder of the image translation network. The MRI image is warped (e.g., deformed) based on the dense deformation field corresponding to the MRI image generated by the learned deformable registration network.

In one embodiment, the registered warped moving image and fixed image (e.g., the warped first image and the second image) are displayed on, for example, a monitor together for diagnosis and/or treatment. The monitor is in communication with the image processor and/or the memory. Additionally or alternatively, a representation of at least one of the deformation fields is displayed by the monitor.

FIGS. 2-5 show an example network architecture. The generator and corresponding discriminator form a generative adversarial network (GAN) for training, where the resulting generator is used for application or testing. The GAN may be a fully convolutional network. The generator may be an image-to-image or U-Net. In one embodiment, the generator includes an encoder (convolutional) network and decoder (transposed-convolutional) network forming a "U" shape with a connection between passing features at a greatest level of compression or abstractness from the encoder to the decoder. Any now known or later developed U-Net or other generator architectures may be used, such as including a densenet. Other fully convolutional networks may be used.

For applications, the generator of the GAN is used without the discriminator. The GAN is applied to the images from different modalities for a given patient by the generator without the discriminator. The discriminator is used for training.

The GAN is a deep architecture, which may include convolutional neural network (CNN) or deep belief nets (DBN). Other deep networks may be used. CNN learns feed-forward mapping functions, while DBN learns a generative model of data. In addition, CNN uses shared weights for all local regions, while DBN is a fully connected network (i.e., having different weights for all regions of an image). The training of CNN is entirely discriminative through back-propagation. DBN, on the other hand, employs the layer-wise unsupervised training (e.g., pre-training), followed by the discriminative refinement with back-propagation if necessary.

The network is defined as a plurality of sequential feature units or layers. Sequential is used to indicate the general flow of output feature values from one layer to input to a next layer. The information from the next layer is fed to a next layer, and so on until the final output. The layers may only feed forward or may be bi-directional, including some feedback to a previous layer. The nodes of each layer or unit may connect with all or only a sub-set of nodes of a previous or subsequent layer or unit.

Rather than pre-programming the features and trying to relate the features to attributes, the deep architecture is defined to learn the features at different levels of abstraction based on input images with or without pre-processing. The features are learned to reconstruct lower level features (i.e., features at a more abstract or compressed level). For example, features for reconstructing an image are learned. For a next unit, features for reconstructing the features of the previous unit are learned, providing more abstraction. Each node of the unit represents a feature. Different units are provided for learning different features.

Within a unit or layer, any number of nodes is provided. For example, 100 nodes are provided. Later or subsequent units may have more, fewer, or the same number of nodes. In general, for convolution, subsequent units have more abstraction. For example, the first unit provides features from the image, such as one node or feature being a line found in the image. The next unit combines lines, so that one of the nodes is a corner. The next unit may combine features (e.g., the corner and length of lines) from a previous unit so that the node provides a shape or building indication. For transposed-convolution to reconstruct, the level of abstraction reverses. Each unit or layer reduces the level of abstraction or compression.

The features of the nodes are learned by the machine using any building blocks. For example, auto-encoder (AE) or restricted Boltzmann machine (RBM) approaches are used. AE transforms data linearly, and then applies a non-linear rectification, like a sigmoid function. The objective function of AE is the expected mean square error between the input image and reconstructed images using the learned features. AE may be trained using stochastic gradient descent or other approach to learn, by the machine, the features leading to the best reconstruction. The objective function of RBM is an energy function. Exact computation of the likelihood term associated with RBM is intractable. Therefore, an approximate algorithm, such as contrastive-divergence based on k-step Gibb sampling or other, is used to train the RBM to reconstruct the image from features.

Training of AE or RBM is prone to over-fitting for high-dimensional input data. Sparsity or denoising techniques (e.g., sparse denoising AE (SDAE)) may be employed to constrain the freedom of parameters and force learning of interesting structures within the data. Enforcing sparsity within hidden layers (i.e., only a small number of units in hidden layers are activated at one time) may also regularize the network. In other embodiments, at least one unit is a convolution with ReLU activation or is a batch normalization with a ReLU activation followed by a convolution layer (BN+LeakyRU+convolution). Max pooling, upsampling, downsampling, and/or softmax layers or units may be used. Different units may be of the same or different type.

Figure 7:
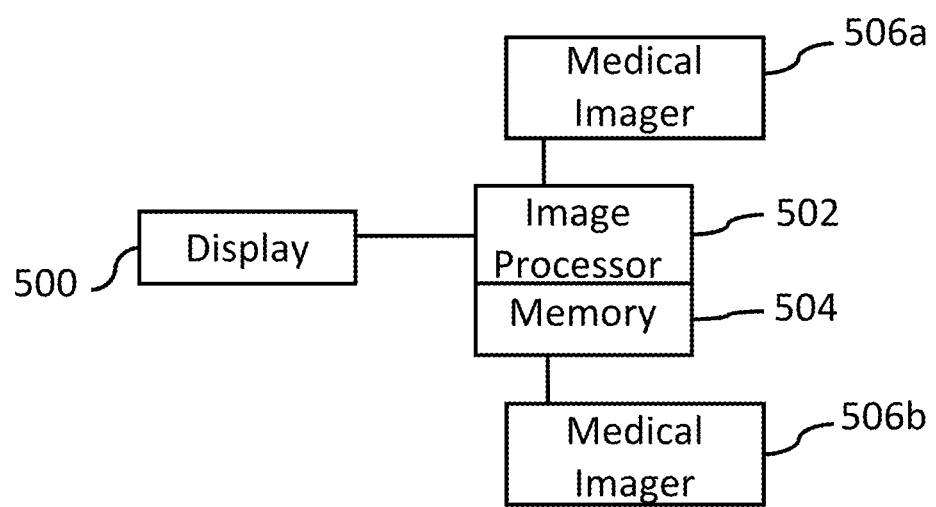
FIG. 7 shows one embodiment of a medical imaging system for image registration and/or therapy decision support.

FIG. 7 shows a medical imaging system for image registration and/or therapy decision support. The system generates registered images on a display 500 to, for example, support therapy, diagnosis, and/or prognosis decisions.

The medical imaging system includes the display 500, an image processor 502, and memory 504. The display 500, the image processor 502, and the memory 504 may be part of at least one medical imager 506, a computer, a server, a workstation, or another system for image processing medical images from a scan of a patient. A workstation or computer without the medical imagers 506 may be used as the medical imaging system.

The medical imaging system shown in FIG. 7 includes two medical imagers 506a, 506b. In other embodiments, the medical imaging system includes more than two medical imagers 506.

Additional, different, or fewer components may be provided. For example, a computer network is included for remote prediction based on locally captured scan data. As another example, a user input device (e.g., keyboard, buttons, sliders, dials, trackball, mouse, or other device) is provided for user interaction with the outcome prediction.

A first medical imager 506a is any number of different medical imaging devices including, for example, a magnetic resonance imaging (MRI) device, a computed tomography (CT) device, a positron emission tomography (PET) device, an ultrasound device, a dynaCT device, an angiogram device, and a mammography device. For example, the first medical imager 506a is an ultrasound device.

A second medical imager 506b is any number of different medical imaging devices including, for example, a magnetic resonance imaging (MRI) device, a computed tomography (CT) device, a positron emission tomography (PET) device, an ultrasound device, a dynaCT device, an angiogram device, and a mammography device. The second medical imager 506b is different than the first medical imager 506a. For example, the second medical imager 506b is an MRI device.

The medical imager 506 is configured by settings to scan a patient. The medical imager 506 is setup to perform a scan for the given clinical problem, such as a lung scan. The scan results in scan or image data that may be processed to generate an image of the interior of the patient on the display 500. The scan or image data may represent a three-dimensional distribution of locations (e.g., voxels) in a volume of the patient. In another embodiment, the image data may represent a two-dimensional distribution of locations (e.g., pixels) in a volume of the patient.

The image processor 502 is a control processor, a general processor, a digital signal processor, a three-dimensional data processor, a graphics processing unit, an application specific integrated circuit, a field programmable gate array, an artificial intelligence processor or accelerator, a digital circuit, an analog circuit, combinations thereof, or other now known or later developed device for processing medical image data. The image processor 502 is a single device, a plurality of devices, or a network. For more than one device, parallel or sequential division of processing may be used. Different devices making up the image processor 502 may perform different functions. In one embodiment, the image processor 502 is a control processor or another processor of a medical diagnostic imaging system, such as one of the medical imagers 506. The image processor 502 operates pursuant to stored instructions, hardware, and/or firmware to perform various acts described herein.

In one embodiment, the image processor 502 is configured to train one or more machine learning networks. Based on a network architecture and training data, the image processor 502 learns features for encoders, decoders, discriminators, generators, or other network parts to train the network. A multi-task generator is trained using nonaligned pairs of images (e.g., decomposed pairs of images) and corresponding losses for two or more tasks. One task is deformation field prediction. The other task uses data unlabeled for outcome, such as radiomic features, segmentation, non-image data, and/or other information that may be more commonly available than deformation field and/or may be derived from the available images.

Alternatively or additionally, the image processor 502 is configured to apply one or more machine-learned generative networks or generators. For example, the image processor 502 applies scan data from the first imager 506*a* and the second imager 506*b* (e.g., corresponding to a same patient and a same region of interest) to a machine-learned multi-task network. The network predicts a dense deformation field for registration between a moving image and a fixed image in response to the input of the moving image and the fixed image. The network may include an encoder of an autoencoder trained in an unsupervised manner and a fully-connected network configured to receive an output of the encoder to predict the dense deformation field. The encoder was trained with a decoder of the autoencoder to estimate an input from the output of the encoder in training in the unsupervised manner.

The image processor 502 is configured to register and display the moving image and the fixed image. The registered moving image and fixed image are displayed for, for example, decision support.

The display 500 is a CRT, LCD, projector, plasma, printer, tablet, smart phone or other now known or later developed display device for displaying the output, such as an image with an outcome prediction.

The scan data, training data, network definition, features, machine-learned network, deformation field, warped image, and/or other information are stored in a non-transitory computer readable memory, such as the memory 504. The memory 504 is an external storage device, RAM, ROM, database, and/or a local memory (e.g., solid state drive or hard drive). The same or different non-transitory computer readable media may be used for the instructions and other data. The memory 504 may be implemented using a database management system (DBMS) and residing on a memory, such as a hard disk, RAM, or removable media. Alternatively, the memory 504 is internal to the processor 502 (e.g. cache).

The instructions for implementing the training or application processes, the methods, and/or the techniques discussed herein are provided on non-transitory computer-readable storage media or memories, such as a cache, buffer, RAM, removable media, hard drive or other computer readable storage media (e.g., the memory 504). Computer readable storage media include various types of volatile and nonvolatile storage media. The functions, acts, or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination.

In one embodiment, the instructions are stored on a removable media device for reading by local or remote systems. In other embodiments, the instructions are stored in a remote location for transfer through a computer network. In yet other embodiments, the instructions are stored within a given computer, CPU, GPU or system. Because some of the constituent system components and method steps depicted in the accompanying figures may be implemented in software, the actual connections between the system components (or the process steps) may differ depending upon the manner in which the present embodiments are programmed.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for unsupervised multi-modal image registration, the method comprising:
   acquiring a first image generated by a first medical imaging modality;
   acquiring a second image generated by a second medical imaging modality, the second medical imaging modality being different than the first medical imaging modality;
   generating a prediction of deformation fields between the first image and the second image, the deformation fields generated by a machine-learned generator having been trained in domain-invariant space with machine-learned discriminators having been trained in image space; and
   registering the first image and the second image using one of the predicted deformation fields.

2. The method of claim 1, wherein the first medical imaging modality is one of a magnetic resonance imaging (MRI) device, a computed tomography (CT) device, a positron emission tomography (PET) device, an ultrasound device, a dynaCT device, an angiogram device, and a mammography device, and the second medical imaging modality is another of the MRI device, the CT device, the PET device, the ultrasound device, the dynaCT device, the angiogram device, and the mammography device.

3. The method of claim 1, wherein the first image and the second image are three-dimensional (3D) images, respectively.

4. The method of claim 1, wherein generating comprises generating with the machine-learned generator having been trained with learned shape features in the domain-invariant space decomposed from multi-modal image pairs representing a region of interest, images of each of the multi-modal image pairs having been generated by the first medical imaging modality and the second medical imaging modality, respectively.

5. The method of claim 4, wherein generating comprises generating with the machine-learned generator having been trained with the shape images decomposed by machine-learned encoders of an image translation network.

6. The method of claim 4, wherein images of the multi-modal image pairs are not aligned.

7. The method of claim 1, wherein generating comprises generating by the machine-learned generator having been trained with latent similarity loss, and the discriminators having been trained with adversarial loss.

8. The method of claim 1, wherein registering comprises registering the first image with the second image using a first of the deformation fields when the first image is a moving image and the second image is a fixed image, and registering the second image with the first image using a second of the deformation fields when the second image is the moving image and the first image is the fixed image.

9. The method of claim 1, wherein the discriminators are discriminators of a generative adversarial network (GAN).

10. The method of claim 1, wherein generating comprises generating with the machine-learned discriminators having been trained based on translated images from a machine-learned image translation network.

11. A system for unsupervised multi-modal image registration, the system comprising:
- a memory configured to store a first image and a second image, the first image being generated by a first modality and the second image being generated by a second modality; and
- an image processor in communication with the memory, the image processor configured to:
  - generate a prediction of deformation fields between the first image and the second image in response to input of the first image and the second image to a machine-learned generator having been trained in domain-invariant space and machine-learned discriminators having been trained in image space; and
  - register the first image and the second image using one of the predicted deformation fields.

12. The system of claim 11, further comprising a display in communication with the image processor, the display being configured to display the registered first image and second image, at least one of the deformation fields, or the registered first image and second image and the at least one deformation field.

13. The system of claim 11, further comprising:
- the first modality in communication with the image processor; and
- the second modality in communication with the image processor.

14. The system of claim 13, wherein the first modality is one of a magnetic resonance imaging (MRI) device, a computed tomography (CT) device, a positron emission tomography (PET) device, an ultrasound device, a dynaCT device, an angiogram device, and a mammography device, and the second modality is another of the MRI device, the CT device, the PET device, the ultrasound device, the dynaCT device, the angiogram device, and the mammography device.

15. The system of claim 11, wherein the first image and the second image are two-dimensional (2D) images, respectively.

16. A method for machine training unsupervised multi-modal image registration in a medical imaging system, the method comprising:
- defining a multi-task network with an objective function including a loss term representing latent space similarity and a loss term representing image space similarity; and
- machine training the multi-task network to estimate a prediction of a deformation field for registration between a first image generated by a first modality and a second image generated by a second modality, the machine training being based on latent shape features in the latent space decomposed from multi-modal image pairs representing a region of interest, images of each of the multi-modal image pairs having been generated by the first modality and the second modality, respectively.

17. The method of claim 16, wherein images of the multi-modal image pairs are not aligned.

18. The method of claim 16, further comprising storing, by a memory, the machine-trained multi-task network.

19. The method of claim 16, wherein the machine training is also based on translated images generated from the multi-modal image pairs being input into an image translation network.

20. The method of claim 16, further comprising registering the first image and the second image using the machine trained multi-task network.

* * * * *